United States Patent [19]
Belser et al.

[11] Patent Number: 6,052,348
[45] Date of Patent: Apr. 18, 2000

[54] SYSTEM AND METHOD FOR WRITE LOCATION DEFECT COMPENSATION IN COMPUTER STORAGE MEDIA

[75] Inventors: Karl A. Belser; Aihua Edward Li, both of San Jose, Calif.

[73] Assignee: Seagate Technology, Inc., Scotts Valley, Calif.

[21] Appl. No.: 09/108,399

[22] Filed: Jul. 1, 1998

Related U.S. Application Data

[63] Continuation-in-part of application No. 08/825,651, Apr. 3, 1997, Pat. No. 5,892,745.
[51] Int. Cl.⁷ ........................................................ G11B 7/00
[52] U.S. Cl. .................................. 369/54; 369/48; 369/58
[58] Field of Search .................................. 369/54, 58, 42, 369/48, 49, 50, 59, 60, 32; 360/48, 51, 53

[56] References Cited

U.S. PATENT DOCUMENTS

| 5,237,553 | 8/1993 | Fukushima et al. ....................... 369/58 |
| 5,245,491 | 9/1993 | Horie et al. .............................. 360/114 |
| 5,270,991 | 12/1993 | Verboom ............................... 369/44.26 |
| 5,493,561 | 2/1996 | Nishiuchi et al. .................... 369/275.1 |
| 5,748,590 | 5/1998 | Iwasaki et al. ......................... 369/47 X |

FOREIGN PATENT DOCUMENTS

| 0283017A1 | 9/1988 | European Pat. Off. . |
| 5-159297 | 6/1993 | Japan . |

*Primary Examiner*—Muhammad Edun
*Attorney, Agent, or Firm*—Carr & Ferrell LLP; Gregory J. Koerner; Susan Yee

[57] ABSTRACT

A system and method for write location defect compensation in computer storage media comprises a reflectivity channel containing a detector device and counter device, an error threshold device coupled to the reflectivity channel for determining if the write location defect requires compensation, and memory devices coupled to a processor for storage of the defective write locations. A processor responsively reallocates write data to a different write location and thus maintains an efficient and reliable data storage system.

22 Claims, 8 Drawing Sheets

SYSTEM AND METHOD FOR WRITE LOCATION DEFECT COMPENSATION IN COMPUTER STORAGE MEDIA

CROSS-REFERENCE TO RELATED APPLICATION

This application claims the benefit and is a continuation-in-part of patent application Ser. No. 08/825,651, U.S. Pat. No. 5,892,745 entitled "System and Method to Compensate for Data Defects Within a Magneto-Optical Computer Memory Device," filed on Apr. 3, 1997. The subject matter of the related application is incorporated herein by reference. All related applications are commonly assigned.

BACKGROUND OF THE INVENTION

1. Field of the Invention

This invention relates generally to memory systems and more particularly to a system and method for write location defect compensation in computer storage media.

2. Description of the Background Art

Figure 1A:
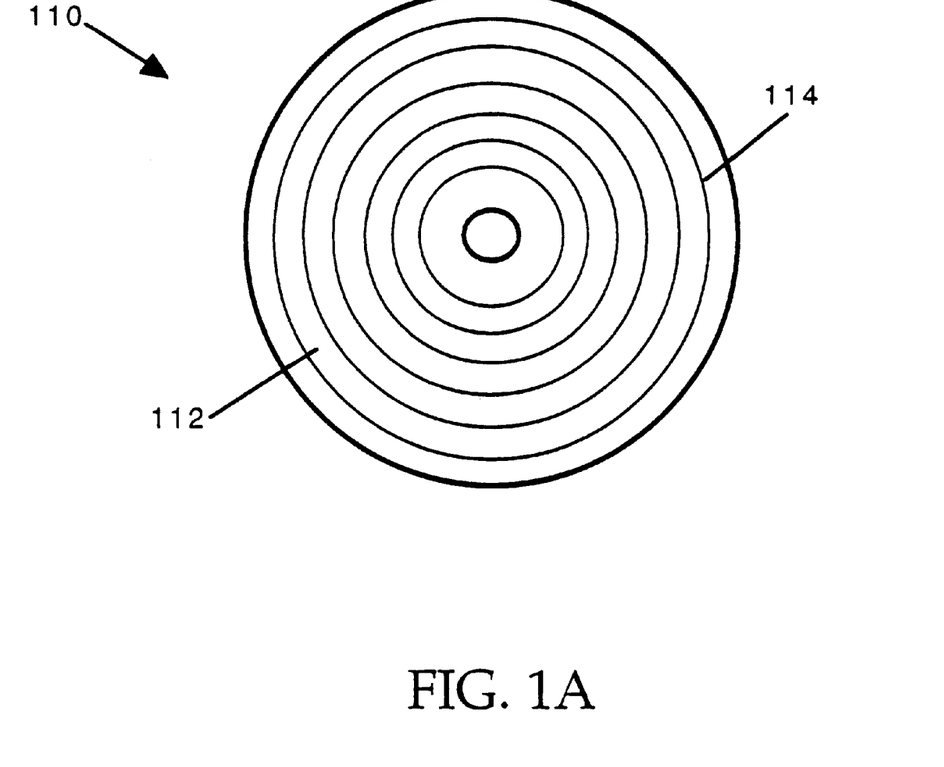
FIG. 1(a) is a plan view of a front surface magneto-optical storage medium, according to the present invention.

Storing and retrieving digital information on dependable media is an important consideration for manufacturers, designers and users of computer systems. In magneto-optical storage devices that use flying heads, digital data is written onto and read from the front surfaces of rotating disks of MO storage media. Referring to FIG. 1(a), a plan view of a front surface 112 of a magneto-optical storage medium 110 is shown. In magneto-optical storage devices, digital data is typically written into and read from a series of concentric or spiral tracks 114 located on the surface 112 of storage medium 110. In practice, data is written to storage medium 110 by projecting a laser-generated light beam to heat front surface 112 of storage medium 110. A magnetic coil embedded on a head device then magnetizes the region with either a vertical up or down orientation. These magnetized orientations alter the optical polarization of light reflected back from storage medium 110 during the read process.

Figure 1B:
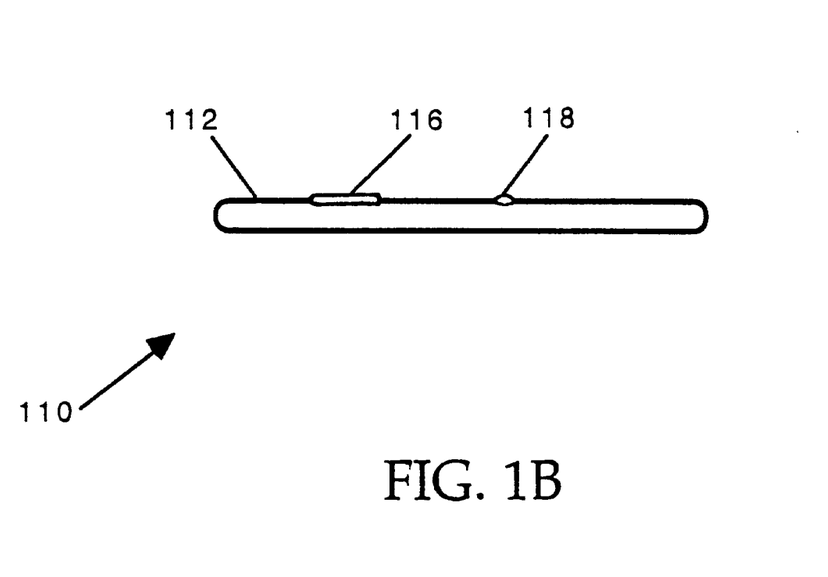
FIG. 1(b) is a cross-sectional view of the front surface magneto-optical storage medium of FIG. 1(a) including several possible causes of write data defects.

During the read process, the digital data is read from the front surface 112 of storage medium 110 by projecting a laser-generated light beam from a flying head onto a selected track 114 while storage medium 110 is rotating, and then sensing the amplitude and polarization of light reflected back from the surface 112 of storage medium 110. Referring now to FIG. 1(b), a cross-sectional view of the FIG. 1 magneto-optical storage medium 110 is shown. In operation, a head device (not shown) is positioned above front surface 112. FIG. 1(b) includes several examples that illustrate possible causes for unreliable or invalid write locations in magneto-optical storage devices. The FIG. 1(b) examples include a corrosion defect 116 and a particulate contamination 118. These examples are presented for the purpose of illustration and defective write locations may alternatively be caused by various other factors.

The FIG. 1(b) examples each significantly alter the data written to and subsequently read from the surface 112 of storage medium 110. Corrosion defect 116 and particulate contamination 118 each affect the recording of magnetic fields during a write operation and also reduce the reflective properties of surface 112. These problems alter the signals of data written to storage medium 110.

As discussed above, corrosion defects 116 and particulate contamination 118 may cause defective write locations in front surface magneto-optical storage devices. From the above discussion, it becomes apparent that MO data is not sufficiently robust to defects. Therefore, an improved system and method is needed for write location defect compensation for computer storage media.

SUMMARY OF THE INVENTION

In accordance with the present invention, a system and method are disclosed for write location defect compensation in computer storage media. In the preferred embodiment of the present invention, a magneto-optical drive performs a write operation and simultaneously reads reflectivity information from a magneto-optical storage medium. Using the reflectivity information, an optics assembly which includes a polarizing beam splitter and separate photo-detectors derives separate electrical MO+ and MO− signals. A reflectivity channel coupled to the data channel accesses and combines the MO+ and MO− signals using a summing amplifier to responsively generate and provide a reflectivity signal to a detector device. The detector device then preferably detects the received reflectivity signal using threshold detection techniques to generate a defect signal.

In practice, only larger defects within a 512 byte write location record will significantly affect the reliability of the digital data. When a defect in a write location occurs, the detector device sends a corresponding defect signal to a counter device which sums up the number of defective bytes for a given write location on the magneto-optical storage medium. The counter device responsively generates a counter signal or error signal representing the sum total of defective bytes. When the counter signal exceeds a preset error threshold, a processor adds the defective location on the storage medium to a secondary defect list in memory. The processor then reallocates the write data from the defective location to a different location on the storage medium. The present invention effectively provides for write location defect compensation in optical computer storage media in order to furnish more efficient and reliable data storage for system users.

DETAILED DESCRIPTION OF THE PREFERRED EMBODIMENT

The present invention relates to write operations in computer storage media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention comprises a system and method to verify write data on a magneto-optical storage medium while simultaneously writing to the same memory device. The system and method includes a reflectivity channel for identifying when a data write operation is not successful due to a defective location on the storage medium and then responsively generating a corresponding defect signal. Defect signals are summed in a counter and when an error threshold is surpassed, the write data on the defective location is reallocated to a different write location. Thus, this system and method for write location defect compensation for computer storage media maintains the reliability of the written data on the storage medium.

Figure 2:
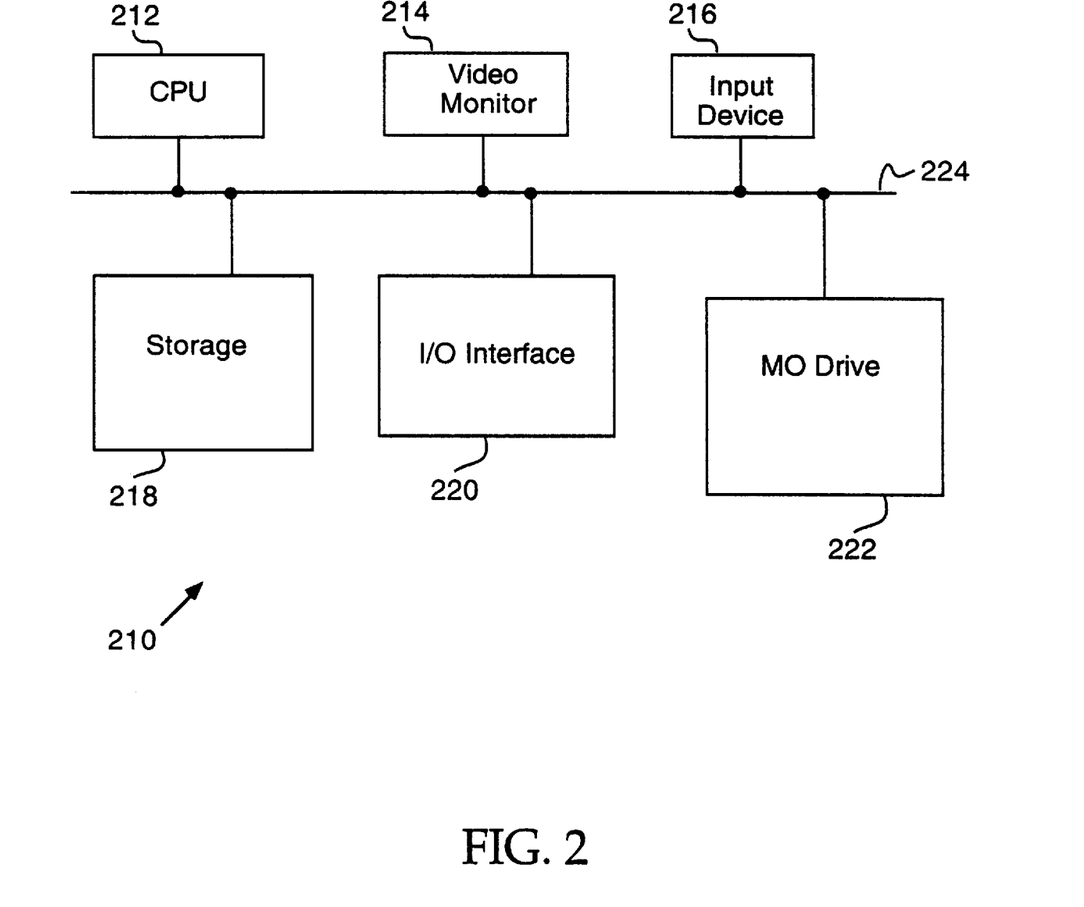
FIG. 2 is a block diagram of a computer system including a magneto-optical drive, according to the present invention.

Referring now to FIG. 2, a computer 210 is shown according to the present invention. Computer 210 preferably comprises a central processing unit (CPU) 212, a video monitor 214, an input device 216, a storage 218, an I/O interface 220 and a magneto-optical drive 222. Each element of computer 210 is preferably coupled to a common system bus 224. Storage 218 may alternatively comprise various storage-device configurations, including Random-Access-Memory (RAM), Read-Only-Memory (ROM) and non-volatile storage devices such as floppy disks. Magneto-optical drive 222 receives, stores and retrieves various types of digital information and is further discussed below in conjunction with FIGS. 3 through 8.

Figure 3:
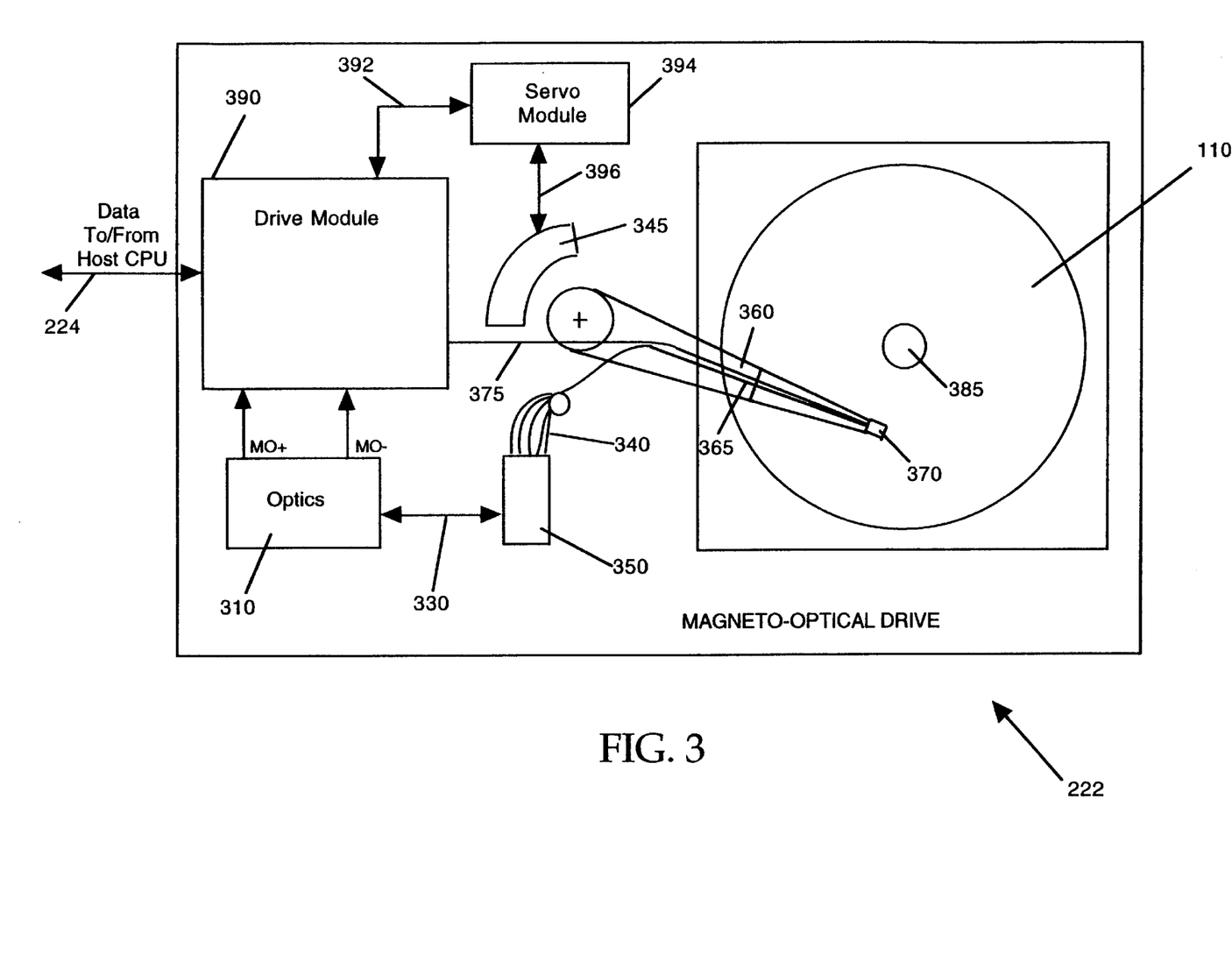
FIG. 3 is a pictorial view of the magneto-optical drive of FIG. 2, according to the present invention.

Referring now to FIG. 3, a pictorial view of the FIG. 2 magneto-optical drive 222 is shown. In the present invention, the mechanical architecture of magneto-optical drive 222 incorporates Flying Magneto-Optical (FMO) head technology with Winchester-type rotary actuator arm, suspension, and air bearing technology in a Magneto-Optical (MO) data storage system. In the preferred embodiment, magneto-optical drive 222 includes optics assembly 310, a Single-Mode Polarization Maintaining (SMPM) optical fiber 330, a fiber optic switch 350, an actuator magnet and coil 345, a plurality of SMPM optical fibers 340, a plurality of head arms 360, a plurality of suspensions 365, a plurality of FMO heads 370, a plurality of MO storage media 110, drive module 390 and servo module 394.

Each of the plurality of MO storage media 110 are preferably mounted on a spindle 385 for continuous rotation at a constant angular velocity and each of the plurality of FMO heads 370 are preferably attached via a respective flexible suspension 365 and head arm 360 to the electromagnetic actuator magnet and coil 345. Those skilled in the art will recognize that MO drive 222 may comprise as few as one FMO head 370 and one MO storage medium 110 or an upper and lower FMO head 370 per a plurality of MO storage media 110.

Figure 4:
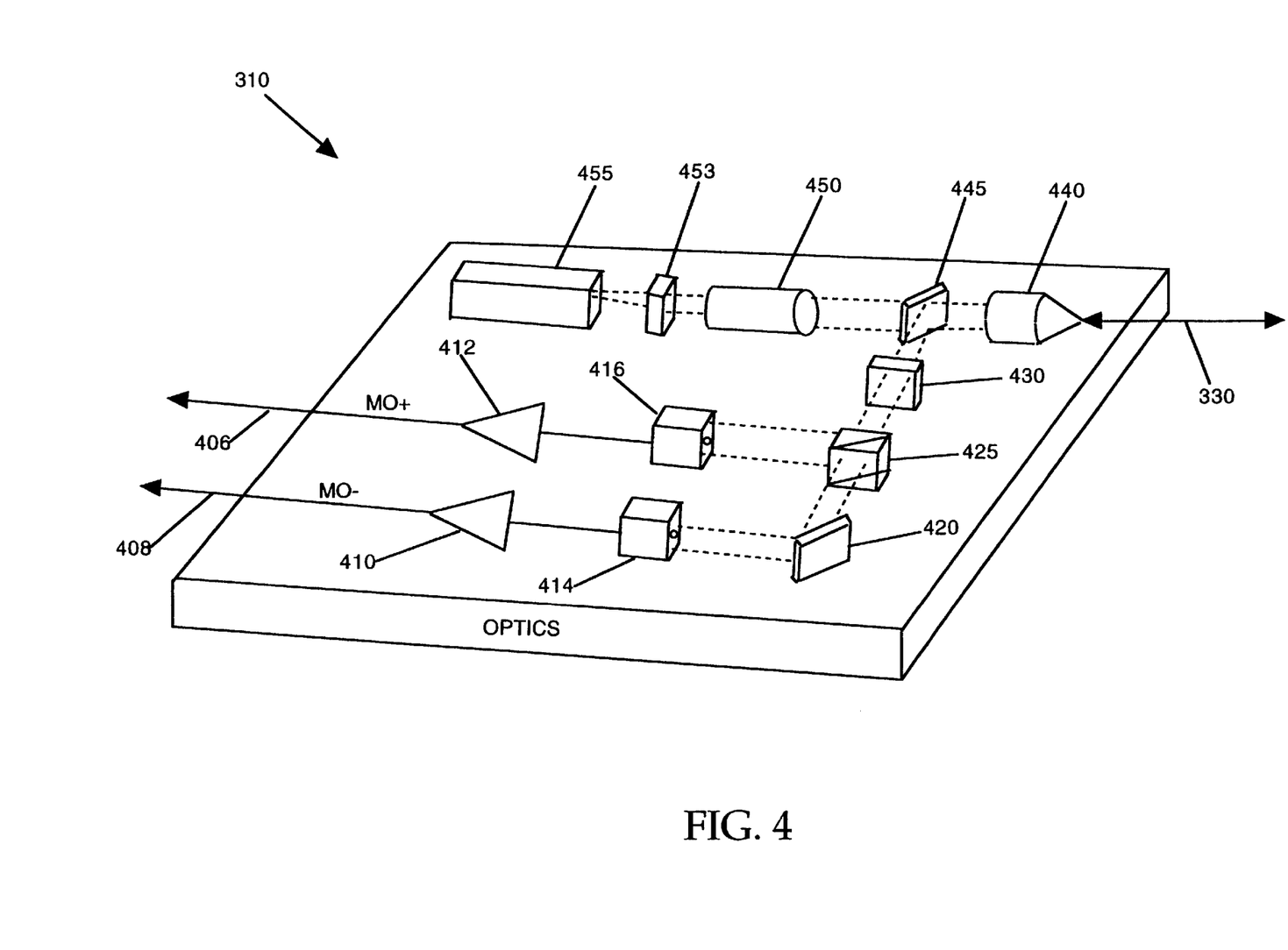
FIG. 4 is an elevation view of the optics assembly of FIG. 3, according to the present invention.

Referring now to FIG. 4, an elevation view of the FIG. 3 optics assembly 310 is shown. Optics assembly 310 includes a laser optical source, a photo-detector system and associated optical components, preferably as a separate subassembly 310 or alternatively as a hybrid integrated circuit component. In the preferred embodiment, optics assembly 310 further includes a distributed feedback (DFB) laser diode 455 polarized optical light source operating in the visible or near ultraviolet region, a leaky beam splitter 445, collimating optics 450 and an optical isolator 453 that is used before passing the laser light from the laser diode 455 to leaky beam splitter 445, and a coupling lens 440 that is preferably a Gradient Refractive Index (GRIN) lens that focuses outgoing light from leaky beam splitter 445 into a Single-Mode Polarization-Maintaining (SMPM) optical fiber 330 feed.

In the preferred embodiment, fiber optic switch 350 (FIG.3) accepts optical fiber 330 at an input port and routes the light emanating from fiber 330 to one of the optical fibers 340 at an output port. The switching properties of fiber optic switch 350 are bi-directional so that light propagating back to the switch 350 along any one of the SMPM optical fibers 340 at the output port may also be routed to the optical fiber 330 at the input port. The SMPM optical fibers 340 from the fiber optic switch 350 are preferably routed along respective head arms 360 and suspensions 365 to respective flying magneto-optical heads 370.

In the preferred embodiment, during writing, light is delivered through an individual optical fiber 340 to a respective FMO head 370 for the purpose of locally heating a respective surface of a rotating magneto-optical storage medium 10, thereby producing a "hot spot." A magnetic coil embedded on FMO head 370 is used to produce a magnetic field that in turn spontaneously magnetizes the region within the hot spot with a vertical orientation either up or down. The magnetic coil receives magnetic modulation signals through line 375 which brings the signal from magnetic field modulator 558 (FIG. 5) found in drive module 390. Thus, as MO storage medium 110 rotates, the applied magnetic field is modulated so as to encode digital data as a pattern of "up or down" magnetic domain orientations. The magnetization direction at the focused spot on storage medium 110 alters the optical polarization of the reflected light via the magneto-optic Kerr effect. Thus, positively rotated light and negatively rotated light is reflected back. In this way, the pattern of up or down magnetization orientations (representative of the stored digital data) modulates the polarization of the light reflected from the storage medium 110.

During the write process, a continuous laser beam is focused on the front surface 112 of magneto-optical storage medium 110 thus generating a continuous reflection of light back. A change in the reflectivity of the light reflected back, signifies that there is a defect at that write location on the front surface 112. The reflected light signal from storage medium 110 couples back through the FMO head 370, one of the plurality of SMPM optical fibers 340, and the fiber optic switch 350, and finally reaches lens 440 via optical fiber 330. Leaky beam splitter 445 then transmits the reflected light signal through half-wave plate 430 to polarizing beam splitter 425 which discriminates against positive and negative planes of polarization in the received light. Polarizing beam splitter 425 thus sends reflected light having a positive plane of polarization to photo-detector 416, and also sends reflected light having negative plane of polarization to photo-detector 414.

Photo-detector 416 responsively converts the positively rotated light into a proportional analog voltage which is amplified by preamplifier 412 before being transmitted to drive module 390 via line 406. Likewise, photo-detector 414 responsively converts the negatively rotated light into a proportional analog voltage which is amplified by preamplifier 410 before being transmitted to drive module 390 via line 408.

Figure 5:
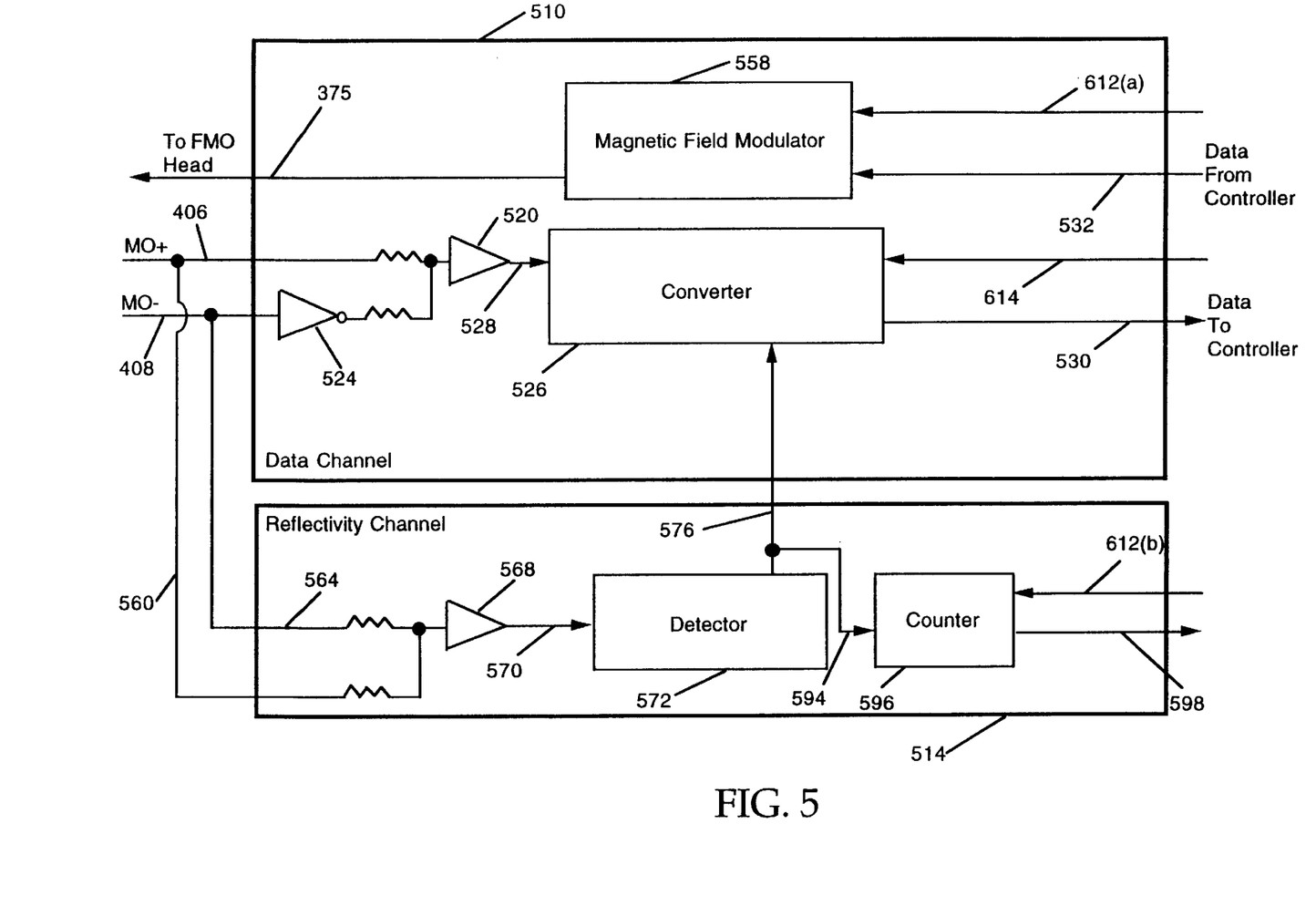
FIG. 5 is a schematic diagram of a data channel and reflectivity channel found within the drive module of FIG. 3.

Referring now to FIG. 5, a schematic diagram of a data channel and reflectivity channel (from the drive module 390 of FIG. 3) is shown. In the preferred embodiment, drive module 390 includes two separate channels (data channel 510 and reflectivity channel 514) because two distinctly different types of light sensing are utilized by magneto-optical drive 222. Data channel 510 senses light reflected from storage medium 110 to determine rotation of the plane of polarization (corresponding to each magnetically-recorded domain) and thus responsively generates corresponding digital data.

In normal operations, data channel 510 receives the MO+ signals from optics assembly 310 via line 406 and receives the MO− signal from optics assembly 310 via line 408. Inverting amplifier 524 then inverts the MO− signal before summing amplifier 520 combines the MO+ and inverted MO− signals to provide an analog data signal to converter 526 via line 528. By combining the MO+ signal with the inverted MO− signals, summing amplifier 520 effectively removes any reflectivity signal information. The converter 526 then converts the analog data signal on line 528 into a digital data signal which is sent out to a controller 610 (FIG. 6) via line 530.

In contrast to data channel 510, reflectivity channel 514 senses the amplitude of light reflected from storage medium 110. To detect defective write locations on storage medium 110, reflectivity channel 514 accesses the MO+ signal via line 560 and the MO− signal via line 564 and advantageously combines the accessed MO+ and MO− signals using summing amplifier 568 to generate a reflectivity signal. The reflectivity signal is sent via line 570 to detector 572.

In the preferred embodiment, detector 572 includes a threshold detector device which low-passes the reflectivity signal received from summing amplifier 568 and then detects whenever the low-passed reflectivity signal crosses above or below a specified threshold value (indicating a write location defect). If the low-passed reflectivity signal passes above or below the specified threshold value, then detector 572 responsively generates a defect signal corresponding to the detected data defect. The defect signal is further described below in conjunction with FIG. 7. Detector 572 provides the generated defect signal to converter 526 via line 576 to essentially omit data defects during the data reading process.

In the preferred embodiment, detector 572 also provides the defect signal via line 594 to counter 596. During a write operation, counter 596 responsively sums the number of defective bytes and sends a counter signal (a defect sum) to microprocessor 630 (FIG. 6) via line 598, where the defect sum is compared to a preset error threshold.

In the preferred embodiment, during the write process, controller 610 (FIG. 6) generates a write gate signal. Magnetic field modulator 558 receives the write gate signal via line 612(*a*). The write gate signal informs magnetic field modulator 558 when to send modulation signals to the magnet coil embedded on FMO head 370 (FIG. 3). Counter 596 in reflectivity channel 514 also receives the write gate signal from controller 610 via line 612(*b*). Because counter 596 only sums defect signals during the write process, the write gate signal is necessary to notify counter 596 when a write operation is in progress.

Figure 6:
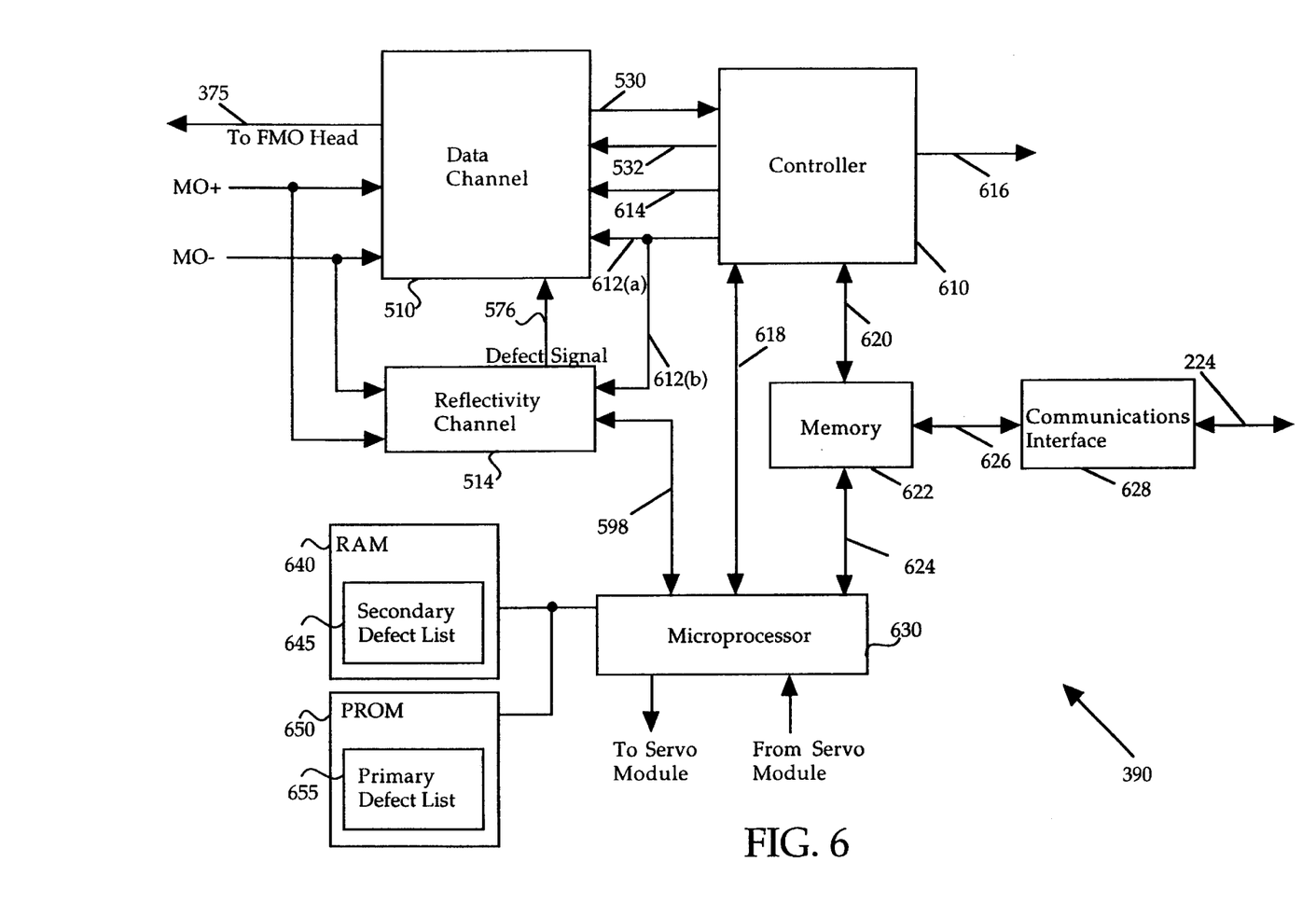
FIG. 6 is a block diagram of the drive module of FIG. 3, according to the present invention.

Referring now to FIG. 6, a block diagram of drive module 390 is shown. In the preferred embodiment, during the read process, a read gate signal generated by controller 610 is sent via line 614 to converter 526 in data channel 510 (FIG. 5). In response, the digital data is transferred from converter 526 in data channel 510 to controller 610. Controller 610 puts the data bytes into memory 622 via line 620. Controller 610 then notifies microprocessor 630 that digital data is ready to go to host CPU 212, and also gives microprocessor 630 a pointer to this data in memory 622. Then, the data travels via line 626 to communications interface 628 and from there, the data travels to host CPU 212 through system bus 224.

The write process is essentially the reverse operation. In the preferred embodiment, microprocessor 630 receives a command from host CPU 212 and notifies communications interface 628 to store the write data received from host CPU 212 into memory 622. Once the write data is stored in memory 622, microprocessor 630 signals controller 61 0 through line 618 to start reading the data for the write operation. Controller 610 then reads write data from memory 622 and passes it via line 532 to magnetic field modulator 558 in data channel 510 (FIG. 5).

In the preferred embodiment during the write process, controller 610 generates a write gate signal and a laser gate signal. The laser gate signal travels from controller 610 via line 616 to the laser diode 455 (FIG. 4) where a continuous laser beam is generated to heat the front surface 112 of magneto-optical storage medium 110. The write gate signal is sent from controller 610 to magnetic field modulator 558 (FIG. 5) via line 612(*a*) and to counter 596 via line 612(*b*). For a further description of the write process, please see the discussion above in conjunction with FIG. 5.

In the preferred embodiment, when a write defect is detected and a counter signal generated, the counter signal travels to microprocessor 630 via line 598. Microprocessor 630 (acting as an error threshold device) compares the counter signal to a preset error threshold to determine if the counter signal is large enough to require reallocating the write data to another location on storage medium 110. The preset error threshold is selectable and is thus stored preferably in volatile memory in microprocessor 630. In an alternative embodiment, the error threshold may be stored in a register in hardware, and when the error threshold is surpassed, the microprocessor 630 is interrupted.

Drive module 390 also contains RAM 640 and PROM 650. PROM 650 holds primary defect list 655 which is compiled during the manufacture of magneto-optical storage medium 110. Primary defect list 655 indexes sectors on magneto-optical storage medium 110 that are defective at the time of manufacture. RAM 640 contains secondary defect list 645. If the error threshold is exceeded, microprocessor 630 then adds the defective write location to secondary defect list 655. Microprocessor 630 then reallocates the write data on the defective location to a different location on magneto-optical storage medium 110.

Figure 7:
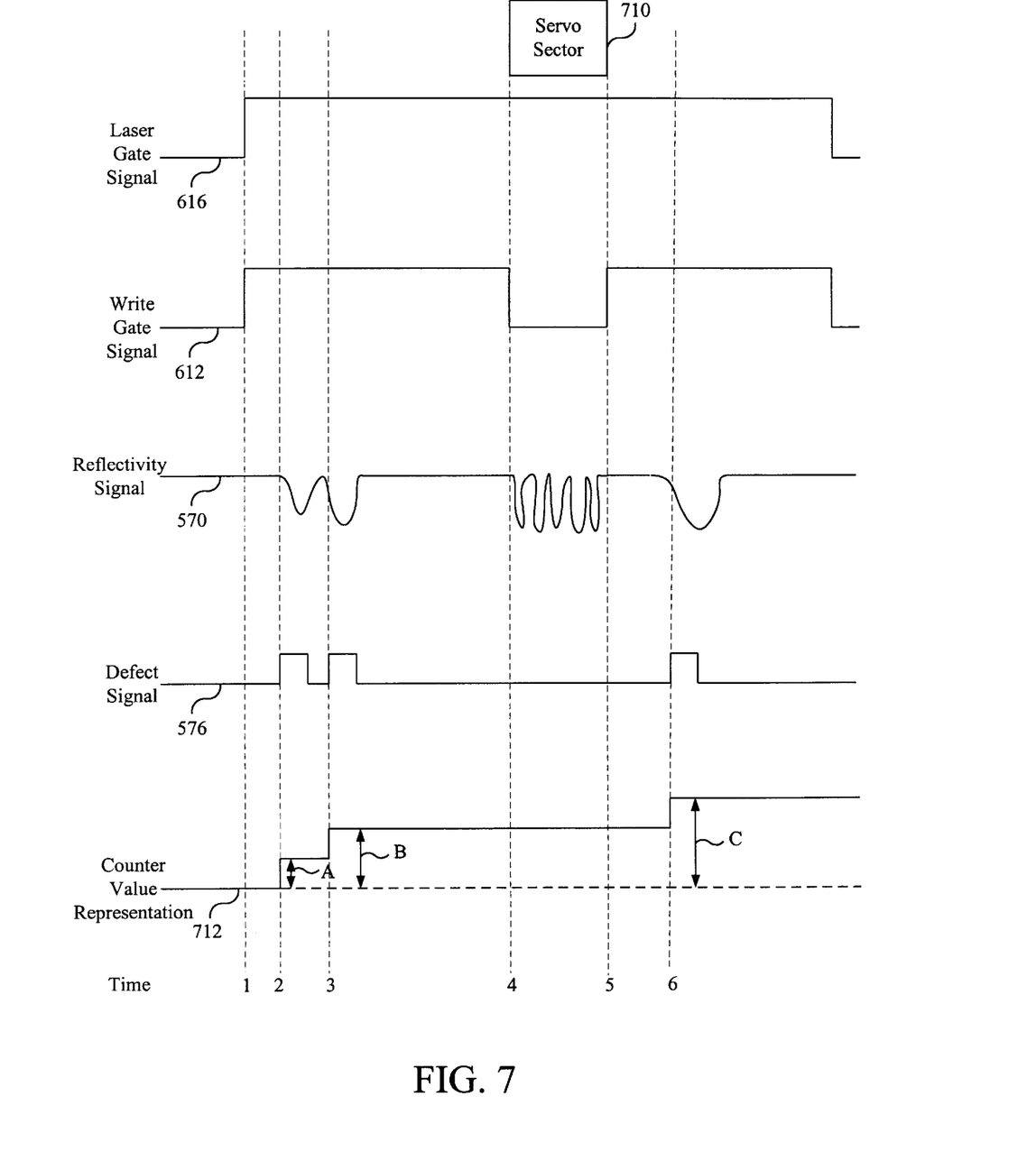
FIG. 7 is a set of defect signal timing waveforms for the drive module of FIG. 3.

Referring now to FIG. 7, one embodiment of defect signal waveforms for the FIG. 3 drive module 390 is shown. The FIG. 7 waveforms include laser gate signal 616 generated by controller 610, write gate signal 612 generated by controller 610, reflectivity signal 570 generated by the summing amplifier 568, defect signal 576 generated by detector 572 and counter signal 598 generated by counter 596. As illustrated in FIG. 7, laser gate signal 616, write gate signal 612, defect signal 576 and counter signal 598 are all preferably at a zero value before the write process begins. Once the write process begins at time 1, laser gate signal 616 preferably goes high and remains high for the duration of the write process to notify the laser diode 455 to generate a continuous laser beam for heating storage medium 110. At time 1, write gate signal 612 also goes high to notify magnetic field modulator 558 to write data to storage media 110, and to notify counter 596 that the write operation is in progress. Write gate signal 612 goes low at time 3 when servo sector 710 begins because the write operation does not occur over servo sector 710. Once servo sector 710 has ended, write gate signal 612 goes high again at time 4 to notify magnetic field modulator 558 and counter 596 that the write operation is in progress again.

Reflectivity channel 514 preferably generates reflectivity signal 570 at a constant level until the reflected laser beam encounters a series of defective write locations on storage media 110 starting at time 2. When the beam encounters a defective write location, reflectivity signal 570 typically decreases. When reflectivity signal 570 passes below a specified threshold value (indicating a defect), detector 572 responsively generates a defect signal 576 which corresponds to the deviation in reflectivity signal 570.

Finally, counter 596 generates counter signal 598 by summing the defective bytes in defect signal 576. Counter value representation 712 is a depiction of binary values summed in counter 596. At time 2, the magnitude of value A corresponds to a binary digital value which is the counter signal 598 output from counter 596. At time 3, the magnitude of value B of counter value representation 712 increases as a result of defect signal 576 going high again. Counter value representation 712 increases at time 6 in response to another defect signal 576 going high which results in a larger magnitude of value C. The resulting counter binary value or defective byte count is then sent to microprocessor 630. If the counter binary value exceeds the preset error threshold in microprocessor 630, microprocessor 630 reallocates the write data to a non-defective location. The counter is then reset to zero which results in the counter binary value resetting to zero.

Figure 8:
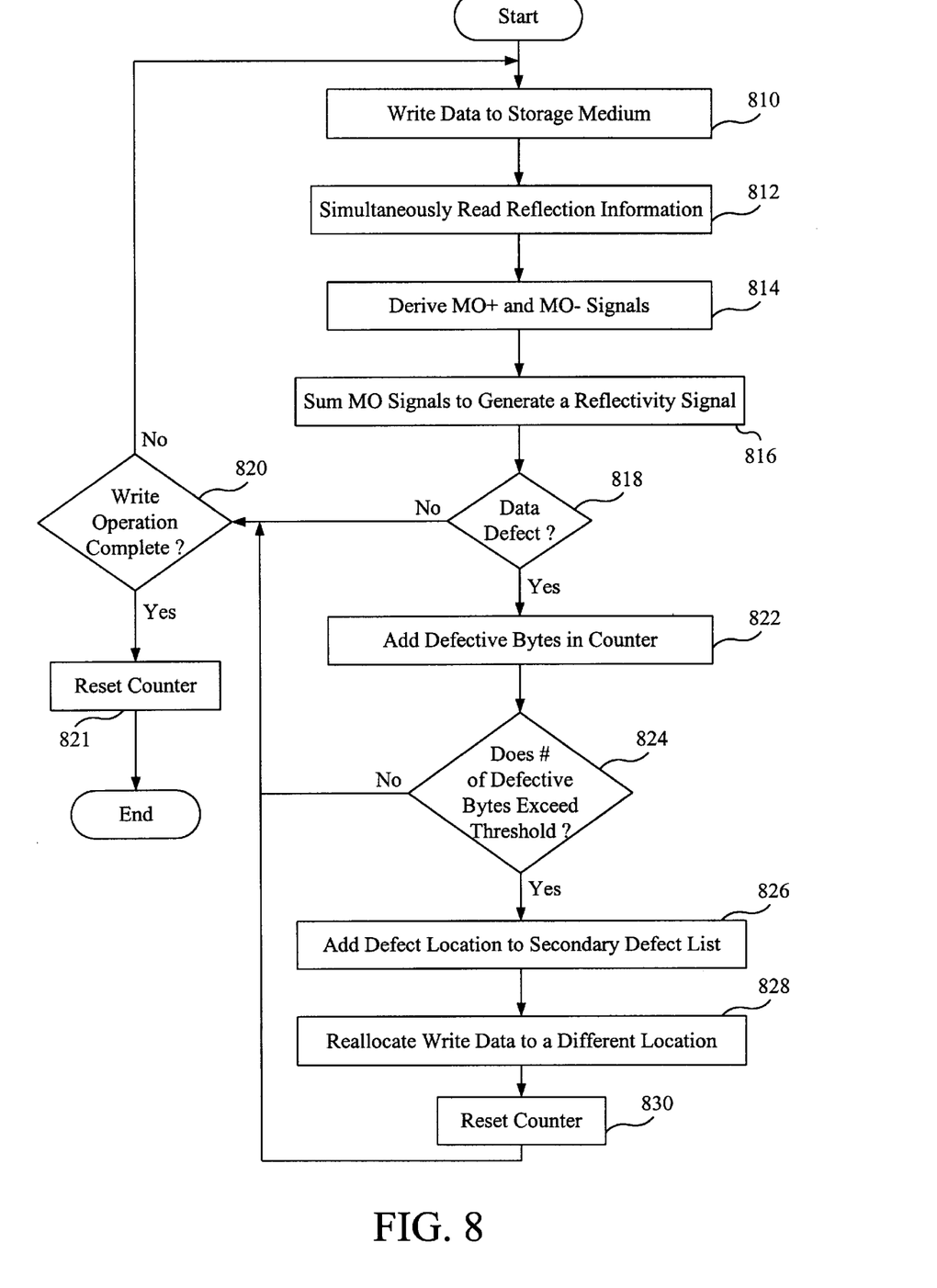
FIG. 8 is a flowchart of preferred method steps for write location defect compensation for computer storage media, according to the present invention.

Referring now to FIG. 8, a flowchart of preferred method steps for write location defect compensation in computer storage media is shown. Initially, in step 810, magneto-optical drive 222 begins optical writing of information to storage medium 110. Controller 610 preferably generates a laser gate signal and a write gate signal. Laser diode 455 receives the laser gate signal and generates a continuous light beam to heat up the front surface 112 of storage medium 110. The write gate signal travels to magnetic field modulator 558 and subsequently, magnetic field modulator 558 sends modulation signals to the magnetic coil on FMO head 370. The write gate signal notifies counter 596 that a write operation is in progress.

In step 812, while the write operation of step 810 is in progress, magneto-optical drive 222 simultaneously reads reflectivity information from the front surface 112 of magneto-optical storage medium 110, as detailed above in conjunction with FIG. 4. In step 814, magneto-optical drive 222 then derives separate electrical MO+ and MO− signals using optics assembly 310, including polarizing beam splitter 425 and photodetectors 414 and 416.

In step 816, reflectivity channel 514 sums the MO+ and MO− signals using summing amplifier 568 to responsively generate a reflectivity signal to detector 572. Next, in step 818, detector 572 compares the low-passed reflectivity signal to determine if the reflectivity signal passes above or below threshold values. If the reflectivity signal passes above or below the threshold values, a defect is detected. If no data defect is detected, step 820 then determines whether the write operation is complete for the current designated write location record. If the write operation is completed, then counter 596 resets in step 821, and the write operation ends for the designated write location record. If, however, the current write operation is not complete, then magneto-optical drive 222 returns to step 810 and continues to write data to storage medium 110.

If, in step 818, a data defect is discovered, then counter 596 adds the defective bytes to the existing value in step 822. In step 824, counter 596 sends the defective byte count to microprocessor 630 where the defect count is compared to a preset error threshold. If the number of defective bytes does not exceed the preset error threshold, then the magneto-optical drive 222 returns to step 820 and determines if the write operation is complete.

If the defect count exceeds the error threshold, then, in step 826, microprocessor 630 adds the defect location to secondary defect list 645 in RAM 640. In step 828, microprocessor 630 then reallocates the write data to a non-defective location on magneto-optical storage medium I 10. Then in step 830, counter 596 is reset to zero, and the FIG. 8 process advances to step 820 to determine if write operation is completed.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for write location defect compensation in a computer memory device, comprising:
   a reflectivity channel for detecting reflectivity signals from a data storage medium, while simultaneously performing a write operation, and responsively generating counter signals; and
   a processor coupled to said reflectivity channel for using said counter signals to identify write location defects on said data storage medium.

2. The system of claim 1, wherein said reflectivity channel includes a detector device, said detector device generating defect signals corresponding to said reflectivity signals.

3. The system of claim 1, wherein said reflectivity channel includes a counter device, said counter device receiving said defect signals and summing bytes in error to generate said counter signals.

4. The system of claim 1, wherein an error threshold device coupled to said reflectivity channel receives and analyzes said counter signals.

5. The system of claim 4, wherein said error threshold device is said processor.

6. The system of claim 5, wherein said processor determines if the write location defects require compensation by analyzing said counter signal, said counter signal being compared to a preset error threshold.

7. The system of claim 1, wherein a memory device coupled to said processor stores a list of defective write locations.

8. The system of claim 7, wherein said memory device is random access memory, said random access memory storing a secondary defect list created during a write process.

9. The system of claim 7, wherein said memory device is programmable read-only memory, said programmable read-only memory storing a primary defect list created during manufacture of said storage medium.

10. The system of claim 1, wherein said processor reallocates write data in error to a different write location on said storage medium.

11. A method for write location defect compensation in a computer memory device, comprising:

performing a write operation to said memory device while simultaneously reading reflectivity information from said memory device into a reflectivity channel;

using the reflectivity information read into said reflectivity channel to generate counter signals corresponding to write location defects; and reallocating write data to a different location on a storage medium in response to said counter signals.

12. The method of claim 11, wherein said reflectivity channel detects said write location defects on said storage medium and generates corresponding defect signals.

13. The method of claim 12, wherein said reflectivity channel includes a detector device, said detector device generating said defect signals.

14. The method of claim 11, wherein said reflectivity channel includes a counter device, said counter device receiving said defect signal and summing bytes in error to generate said counter signal.

15. The method of claim 11, wherein an error threshold device coupled to said reflectivity channel receives and analyzes said counter signal.

16. The method of claim 15, wherein said error threshold device is a processor.

17. The method of claim 16, wherein said processor determines if the write location defect requires compensation by analyzing said counter signal, said counter signal being compared to a preset error threshold.

18. The method of claim 11, wherein a memory device coupled to said processor stores a list of defective write locations.

19. The method of claim 18, wherein said memory device is random access memory, said random access memory storing a secondary defect list created during a write process.

20. The method of claim 18, wherein said memory device is programmable read-only memory, said programmable read-only memory storing a primary defect list created during manufacture of said storage medium.

21. The method of claim 11, wherein said processor reallocates write data in error to a different write location on said storage medium.

22. A system for write location defect compensation in a computer memory device, comprising:

means for detecting write location defects in a computer storage medium by reading reflectivity information while performing write operations;

means for generating defect signals corresponding to said write location defects;

means for generating counter signals corresponding to bytes in error from said defect signals;

means for comprising said counter signals to an error threshold to determine if compensation is required; and means for reallocating write data to a different location on storage medium.

* * * * *